Figure 2:
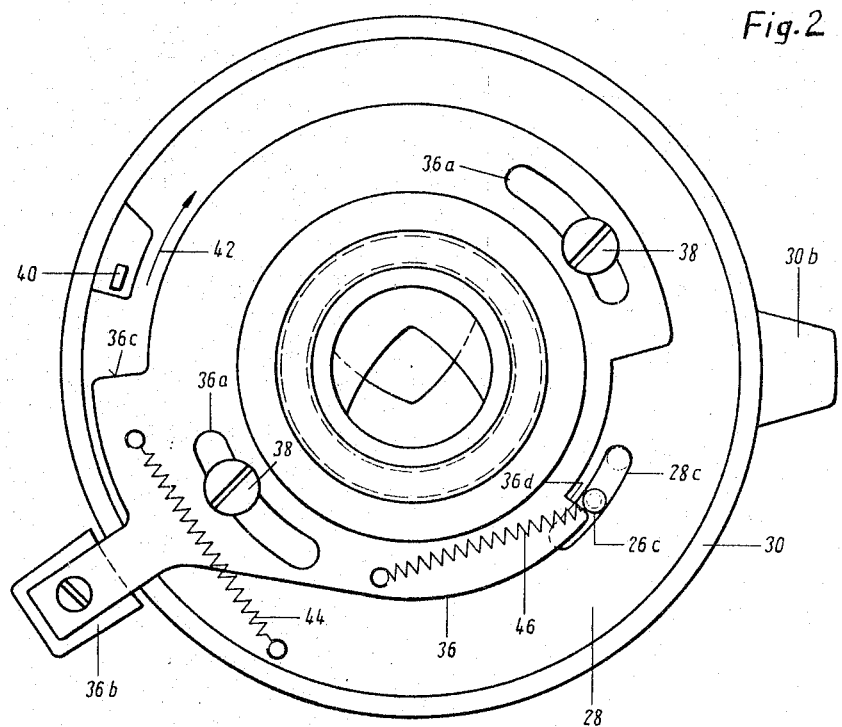

March 14, 1967     E. SPIESSL     3,308,735

CONTROL MECHANISM FOR PHOTOGRAPHIC EQUIPMENT

Filed July 22, 1964     2 Sheets-Sheet 1

United States Patent Office 3,308,735
Patented Mar. 14, 1967

3,308,735
CONTROL MECHANISM FOR PHOTOGRAPHIC EQUIPMENT
Ewald Spiessl, Am Rain, Germany, assignor to Compur-Werk Gesellschaft mit beschränkter Haftung & Co., Munich, Germany
Filed July 22, 1964, Ser. No. 384,378
Claims priority, application Germany, Aug. 8, 1963, C 30,653
3 Claims. (Cl. 95—64)

The present invention relates to a control mechanism for photographic equipment and more specifically has application with a shutter having a rotatable manual setter having a cam surface and a slidable transmission member disposed adjacent thereto and means to position the transmission member in accordance with the predetermined position of the setter ring and cam.

While the present invention has wide application in the photographic field, it finds specific utility in connection with the operation of a diaphragm of a shutter and this application will be described in detail.

It is desirable to provide a diaphragm setting mechanism which is simple yet sturdy, which is easy to operate and which is readily adaptable to manual or automatic operation. These objectives are achieved by the present invention by providing a rotatable hand setter which has a cam on the inner surface thereof. A rotatable control ring is coupled to the diaphragm blades so that rotation of the control ring opens or closes the diaphragm to the desired aperture. Slidable in a groove in the housing is a transmission member having pins at each end thereof. One pin is adapted to cooperate with the cam on the setter ring and the other pin engages a slot in the control ring. Rotation of the control ring moves the transmission member outwardly until it engages the cam which prevents further rotation of the control ring and thus the position of the cam determines the amount of rotation of the control ring and consequently the diaphragm opening.

The elements of the setting device may be made of a material having good self-lubricating and slip-promoting properties, thereby avoiding the necessity for liquid or powdered lubricants. This material may comprise a self-lubricating plastics material such as acetal resin and the transmission slide and pins may be made of this material by an injection moulding method. Furthermore the diaphragm control ring with the slot therein for engagement with the coupling pin of the transmission member and the pins for engagement with slots in the diaphragm blades may be made of plastic material by an injection moulding technique.

An object of the present invention is to provide a setting device for photographic equipment in which a cam on a setting ring cooperates with a slidable transmission member which is guided for rectilinear movement in a housing.

Figure 1:
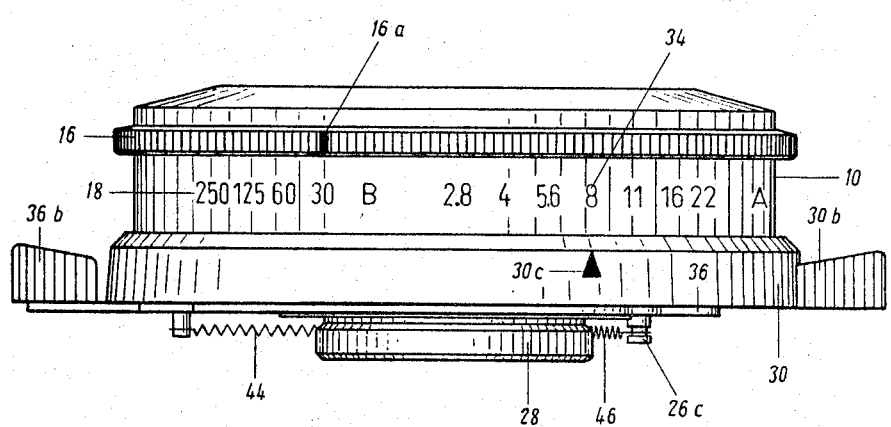
Figure 3:
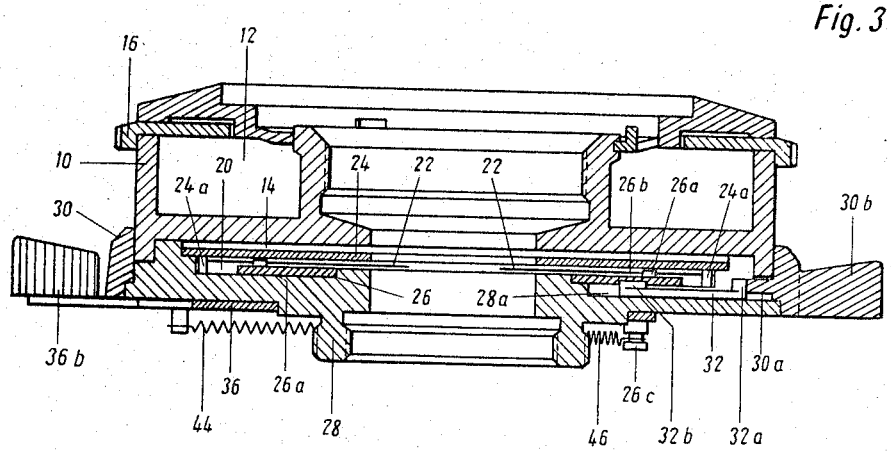
Figure 4:
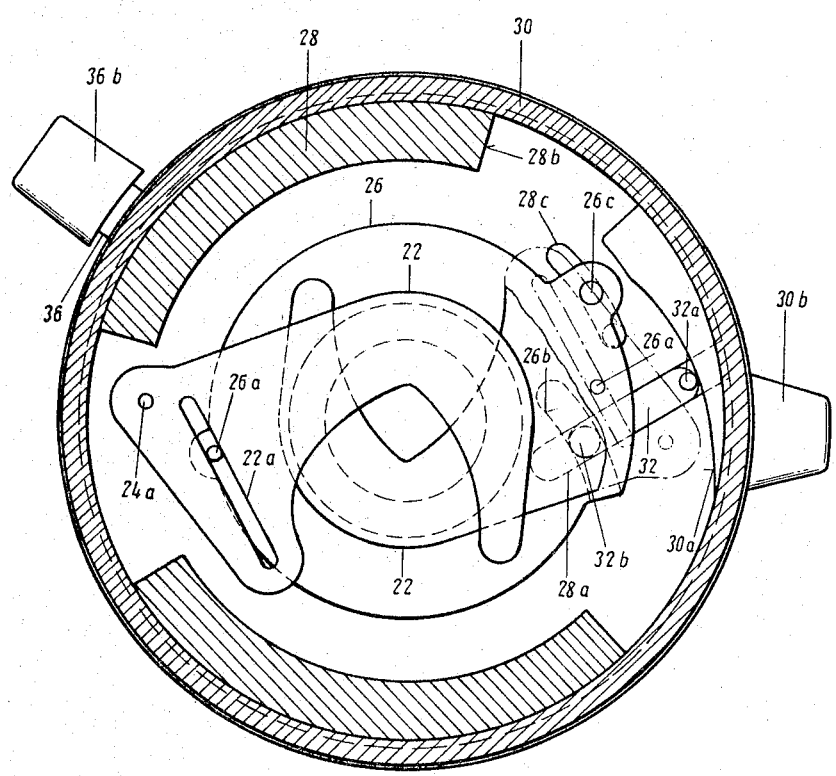

Other objects and many of the attendant advantages of the present invention will become more readily apparent upon consideration of the following detailed specification in connection with the accompanying drawing wherein:

FIG. 1 is a plan view of a photographic shutter embodying the present invention,
FIG. 2 is a rear view of the shutter shown in FIG. 1,
FIG. 3 is a transverse sectional view, and
FIG. 4 is a longitudinal sectional view.

The invention will now be described in reference to the diaphragm setting device of a photographic objective shutter.

The shutter blades are installed in gap 14 and the mechanism for operating these blades is installed in the annular space 12 of the shutter housing 10. This mechanism is known per se and is therefore not shown in detail. A hand setter 16, which is provided with a ribbed outer surface has a mark 16a which cooperates with a time scale 18 on the periphery of the shutter housing 10. This setter is used to set the required period of exposure. Also installed in the annular gap 20 within the shutter housing 10 is a diaphragm arrangement comprising two blades 22. Each diaphragm blade 22 is pivotally mounted on a bearing pin 24a of a fixed bearing ring 24 and each blade has a control slot 22a which is engaged by a control pin 26a on a diaphragm control ring 26. A diaphragm manually setting ring 30 is rotatably mounted on the periphery of the housing 10 and is disposed between this housing 10 and the plate 28 which is firmly screwed into the wall of the housing and carries the rear objective tube. There is provided a setting cam 30a which is disposed on the inner periphery of ring 30 and this cam projects inwardly through a peripheral slot 28b in the housing plate 28. A rectilinear slot 28a is milled in the part 28, and a transmission slide 32 is guided in this slot and slide 32 has two pins 32a and 32b projecting from one longitudinal surface thereof. The pin 32a cooperates with the setting cam 30a of the hand setter 30 while pin 32b engages in a curved coupling slot 26b of the diaphragm control ring 26. The control ring also has a pin 26c which is parallel to the optical axis of the mechanism and which projects out rearwards through an opening 28c in the housing plate 28. In addition the hand setter 30 has a finger grip 30b and a mark 30c which cooperates with a diaphragm scale 34 and an index A disposed on the periphery of the shutter housing 10.

Mounted on the rear side of the housing plate 28 is an operating ring 36 which has two slots 36a which cooperate with two fixed guide screws 38 to allow the ring 36 to be rotated. The ring 36 has a finger grip 36b and a shoulder 36c which co-acts with an operating lug 40 which projects out of the shutter housing. The lug 40 can be urged by the shoulder 36c in the direction of arrow 42 and the driving means (not shown) of the shutter thereby cocked before being released so as to operate the shutter (automatic or self-cocking shutter). A return spring 44 is anchored at one end to the housing plate 28 and at the other to the ring 36 and urges ring 36 into a rest position determined by the engagement of the pin 38 with the end of the slot 36a. A tension spring 46 is anchored to the pin 26c and to the ring 36. Finally, a further shoulder 36d is provided on the ring 36 and this co-acts with the pin 26c in a manner to be described more fully hereinafter.

In addition it is pointed out that the hand setter 30 is retained by a detent device (not shown) in each position of the diaphragm scale 34 or in the setting determined by the mark A.

In the rest position the operating ring 36 is held by engagement of screws 38 with the end of the slot under the action of the return spring 44. In this condition the shoulder 36d thereof bears against the pin 26c and holds it in the limiting position which is indicated in dotted lines in FIGS. 2 and 4, and in which the diaphragm blades 22 fully open the objective aperture. The slide is drawn radially inwards by the action of the diaphragm control ring 26 in this limiting position, acting through its control slot 26b, and is held out of engagement with the setting cam 30a of the hand setter 30. The user can now set a required diaphragm value, the value 8 in the case illustrated in FIG. 1, by rotating the hand setter 30, whereby the setting cam 30a assumes a specific position relatively to the pin 32a.

If now, for the purpose of taking a photograph the operating ring 36 is turned by hand from its rest position in the direction of arrow 42 against the action of its return spring 44, the diaphragm control ring 26 is likewise moved in this direction through the tension spring 46 which moves therewith. The pin 26c moves in the counter-clockwise direction from the limit position indicated in dotted lines in FIG. 4 into the position shown in full line, the transmission slide 32 being moved radially outwards in its guide slot 28a by the action of the control slot 26b and the pin 32b and stops the movement of the diaphragm control ring 26. The diaphragm blades 22 thus assume the position corresponding to the diaphragm value which has been set.

During continued movement of the operating ring 26 in the direction of arrow 42 the engagement between pin 26c and abutment 36d is broken and the spring 46 is further tensioned. From this time onwards the ring 36 moves alone relatively to the stationary ring 26 until shoulder 36c meets the operating lever 40 of the shutter and actuates the shutter mechanism for opening and closing of the shutter blades. After the photograph has been taken and the finger grip 36b has been released, the operating ring 36 returns to its rest position under the action of its return spring 44, the shoulder 36d thereof bringing the pin 26c and thus the diaphragm control ring back into the full diaphragm aperture position.

When it is required to use an automatic adjustment of the diaphragm, the manual setter 36 is shifted to A. The setting cam 30a is then moved out of the range of the pin 32a of the transmission slide 32, and the diaphragm aperture, when the ring 36 is rotated, is now determined by the engagement of the pin 26c during its movement in the direction of arrow 42 with an abutment (not shown) which is controlled by a photoelectric exposure meter of the camera. The remainder of the setting procedure is the same as in the case of manual setting, with the exception of the previously stated difference that the transmission slide 32 now moves idly in its control slot 28a, that is to say, without meeting the setting cam 30a.

The transmission slide 32 of the setting device according to the invention does not take up very much room in the shutter housing because it can be countersunk, with its limited range of movement between the housing plate 28 and the ring 26. The stresses applied to the transmission slide during the setting procedures is small. Thus the slide 32 and the diaphragm control ring 26 may be made of a plastic material. The slide operates on the part 28 of the housing which is of light metal. In this connection the parts 26 and 32 are preferably made in mass production by injection moulding, because this will afford a sufficient degree of accuracy in the shape and dimensions of the parts. Moreover, a self-lubricating plastics material, for example acetal resin, is preferably used in the manufacture of these parts, this material having the requisite high self-lubricating and slip-promoting properties. In this way the disclosed diaphragm arrangement can be operated with a very small manual effort and also may be used with automatic diaphragm control. Finally the use of the transmission slide and the control cam cooperating therewith allows for the angular range of the diaphragm manual setter to be adapted in very simple fashion to the prevailing conditions in accordance with the angular range of the diaphragm control ring.

Obviously many modifications and variations of the present invention are possible in light of the above teachings. What is claimed as new and is desired to be secured by Letters Patent is:

1. A setting device for photographic equipment comprising a housing, diaphragm blades pivotally mounted in said housing, a control ring operatively connected to said diaphragm blades whereby rotation of the control ring positions the blades, a setter ring rotatably mounted on said housing, a cam on said setter ring, a transmission member slidable in said housing, means on said transmission member cooperating with said control ring whereby rotation of said control ring causes said transmission member to slide, a pin on one end of said transmission member engageable with said cam whereby the position of said cam determines the degree of rotation of said control ring, and further including a driving pin on said control ring adapted to cooperate with an abutment positioned by a photo-electric exposure meter.

2. A setting device for a photographic equipment comprising a housing, pivotally mounted diaphragm blades, a control ring rotatable in said housing, a control surface on said control ring, means on said control ring engageable with said diaphragm blades whereby rotation of said control ring pivots said blades, a setter ring rotatably mounted on said housing, a cam on the inner periphery of said ring, a transmission member slidable in said housing, a projection on each side of said member, the projection on one end of the member engageable with the cam and the projection on the other end of the member engageable with the control surface, rotation of the control ring in one direction causing outward movement of the transmission member toward the cam of the setter ring, and rotation of the setter ring in one direction causing inward movement of the transmission member toward the control surface of the control ring.

3. A setting device for a photographic shutter comprising a shutter housing, diaphragm blades pivotally mounted in said housing, a control ring rotatable in said housing, pins on said control ring engageable in slots on said diaphragm blades whereby rotation of said control ring pivots said blades, a setter ring rotatably mounted on said housing, a cam on the inner periphery of said ring, a transmission member slidable in said housing, a projection on each end of said member, the projection on one end of the member engageable with the cam and the projection on the other end of the member engageable in a slot in the control ring, rotation of the control ring in one direction causing outward movement of the transmission member to a point wherein the members engages the cam to prevent further rotation of the control ring.

References Cited by the Examiner

UNITED STATES PATENTS

| | | | |
|---|---|---|---|
| 2,572,229 | 10/1951 | Willcox | 95—56 |
| 3,148,602 | 9/1964 | Kiper | 95—10 |

NORTON ANSHER, *Primary Examiner.*

C. B. PRICE, *Assistant Examiner.*